(12) United States Patent
Nilsson

(10) Patent No.: US 10,992,362 B2
(45) Date of Patent: Apr. 27, 2021

(54) HANDLING OF BEAM PAIR LINKS

(71) Applicant: Telefonaktiebolaget LM Ericsson (publ), Stockholm (SE)

(72) Inventor: Andreas Nilsson, Gothenburg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 169 days.

(21) Appl. No.: 16/066,023

(22) PCT Filed: May 28, 2018

(86) PCT No.: PCT/EP2018/063947
§ 371 (c)(1),
(2) Date: Jun. 25, 2018

(87) PCT Pub. No.: WO2019/228607
PCT Pub. Date: Dec. 5, 2019

(65) Prior Publication Data
US 2020/0119798 A1 Apr. 16, 2020

(51) Int. Cl.
*H04W 76/19* (2018.01)
*H04B 7/06* (2006.01)
(Continued)

(52) U.S. Cl.
CPC ......... *H04B 7/0695* (2013.01); *H04L 5/0048* (2013.01); *H04W 36/30* (2013.01);
(Continued)

(58) Field of Classification Search
CPC ... H04B 7/0695; H04B 7/0408; H04W 36/30; H04W 76/19; H04W 72/046;
(Continued)

(56) References Cited

U.S. PATENT DOCUMENTS

2014/0153423 A1* 6/2014 Shin ................. H04W 36/18
370/252
2016/0087877 A1* 3/2016 Ryu ................. H04W 76/16
370/329

(Continued)

OTHER PUBLICATIONS

Mediatek, Inc., "R1-1702730: Aspects for UE-initiated beam recovery," 3GPP TSG RAN WG1 Meeting #88, Feb. 13-17, 2017, Athens, Greece, 5 pages.
(Continued)

*Primary Examiner* — Kenneth T Lam
(74) *Attorney, Agent, or Firm* — Withrow & Terranova, PLLC

(57) ABSTRACT

There is provided mechanisms for causing a switch to an alternative beam pair link. A terminal device is configured with a trigger condition for beam link failure. A method is performed by the terminal device. The method comprises estimating, during communication with a network node over a current beam pair link, that performance of the communication would be better if using the alternative beam pair link instead of the current beam pair link for the communication. The method comprises reporting beam link failure of the current beam pair link to the network node, without the trigger condition for beam link failure of the current beam pair link being met, thereby causing the switch to the alternative beam pair link.

20 Claims, 5 Drawing Sheets

(51) Int. Cl.
*H04W 76/20* (2018.01)
*H04L 5/00* (2006.01)
*H04W 36/30* (2009.01)
*H04W 72/04* (2009.01)

(52) U.S. Cl.
CPC ......... *H04W 72/046* (2013.01); *H04W 76/19* (2018.02); *H04W 76/20* (2018.02)

(58) Field of Classification Search
CPC . H04W 76/20; H04W 16/28; H04W 36/0069; H04L 5/0048
See application file for complete search history.

(56) References Cited

U.S. PATENT DOCUMENTS

| | | | | |
|---|---|---|---|---|
| 2018/0278310 | A1* | 9/2018 | Lee | H04L 5/0053 |
| 2019/0037423 | A1* | 1/2019 | Yu | H04B 7/06 |
| 2019/0081687 | A1* | 3/2019 | Sadiq | H04W 74/0833 |
| 2019/0174385 | A1* | 6/2019 | Sang | H04W 36/0072 |
| 2019/0253127 | A1* | 8/2019 | Kang | H04L 5/00 |
| 2019/0274098 | A1* | 9/2019 | Cheng | H04L 5/0091 |
| 2019/0306867 | A1* | 10/2019 | Cirik | H04W 74/006 |
| 2019/0349915 | A1* | 11/2019 | Ahn | H04B 7/0695 |
| 2020/0092785 | A1* | 3/2020 | Yang | H04W 76/19 |

OTHER PUBLICATIONS

Mediatek, Inc., "R1-1713697: Discussion on Beam Recovery Mechanism," 3GPP TSG RAN WG1 Meeting #90, Aug. 21-25, 2017, Prague, Czech, 6 pages.

Samsung, "R1-1702939: Trigger condition for beam failure recovery," 3GPP TSG RAN WG1 Meeting #88, Feb. 13-17, 2017, Athens, Greece, 4 pages.

Samsung, "R2-1702002: UE triggering conditions of beam recovery," 3GPP TSG-RAN WG2 2017 RAN2#97 Meeting, Feb. 13-17, Athens, Greece, 4 pages.

International Search Report and Written Opinion for International Patent Application No. PCT/EP2018/063947, dated Feb. 5, 2019, 16 pages.

* cited by examiner

HANDLING OF BEAM PAIR LINKS

This application is a 35 U.S.C. § 371 national phase filing of International Application No. PCT/EP2018/063947, filed May 28, 2018, the disclosure of which is incorporated herein by reference in its entirety.

TECHNICAL FIELD

Embodiments presented herein relate to a method, a terminal device, a computer program, and a computer program product for causing a switch to an alternative beam pair link.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). One task of the beam management procedure is to discover and maintain beam pair links. A BPL (as defined by the beam used by the network node and the beam used by the terminal device) is expected to be discovered and monitored by the network using measurements on downlink reference signals, such as channel state information reference signals (CSI-RS) or synchronization signal block (SSB) signals, used for beam management.

The reference signals for beam management can be transmitted periodically, semi-persistently or aperiodically (event triggered) and they can be either shared between multiple terminal devices or be device-specific. In order for the terminal device to find a suitable network node beam, the network node transmits the reference signal in different transmission (TX) beams on which the terminal device performs measurements, such as reference signal received power (RSRP), and reports back the N best TX beams (where N can be configured by the network). Furthermore, the transmission of the reference signal on a given TX beam can be repeated to allow the terminal device to evaluate a suitable reception (RX) beam.

It could be that after a while, the beams of the current BPL no longer are the best, in terms of some quality criterion, for the communication between the terminal device and the network node.

There is therefore a need for efficient handling of BPLs.

SUMMARY

An object of embodiments herein is to provide efficient handling of BPLs, and particularly in scenarios where the beams of the current BPL no longer are the best, in terms of some quality criterion, for the communication between the terminal device and the network node.

According to a first aspect there is presented a method for causing a switch to an alternative beam pair link. The method is performed by a terminal device. The terminal device is configured with a trigger condition for beam link failure. The method comprises estimating, during communication with a network node over a current beam pair link, that performance of the communication would be better if using the alternative beam pair link instead of the current beam pair link for the communication. The method comprises reporting beam link failure of the current beam pair link to the network node, without the trigger condition for beam link failure of the current beam pair link being met, thereby causing the switch to the alternative beam pair link.

According to a second aspect there is presented a terminal device for causing a switch to an alternative beam pair link. The terminal device is configured with a trigger condition for beam link failure. The terminal device comprises processing circuitry. The processing circuitry is configured to cause the terminal device to estimate, during communication with a network node over a current beam pair link, that performance of the communication would be better if using the alternative beam pair link instead of the current beam pair link for the communication. The processing circuitry is configured to cause the terminal device to report beam link failure of the current beam pair link to the network node, without the trigger condition for beam link failure of the current beam pair link being met, thereby causing the switch to the alternative beam pair link.

According to a third aspect there is presented a terminal device for causing a switch to an alternative beam pair link. The terminal device is configured with a trigger condition for beam link failure. The terminal device comprises an estimate module configured to estimate, during communication with a network node over a current beam pair link, that performance of the communication would be better if using the alternative beam pair link instead of the current beam pair link for the communication. The terminal device comprises a report module configured to report beam link failure of the current beam pair link to the network node, without the trigger condition for beam link failure of the current beam pair link being met, thereby causing the switch to the alternative beam pair link.

According to a fourth aspect there is presented a computer program for causing a switch to an alternative beam pair link, the computer program comprising computer program code which, when run on a terminal device, causes the terminal device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously this enables efficient handling of beam pair links.

Advantageously this provides efficient handling of scenarios where the beams of the current beam pair link no longer are the best, in terms of some quality criterion, for the communication between the terminal device and the network node Advantageously this enables the terminal device to in an efficient manner indicate to the network node that a better beam pair link exists which will lead to improved performance for the terminal device.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
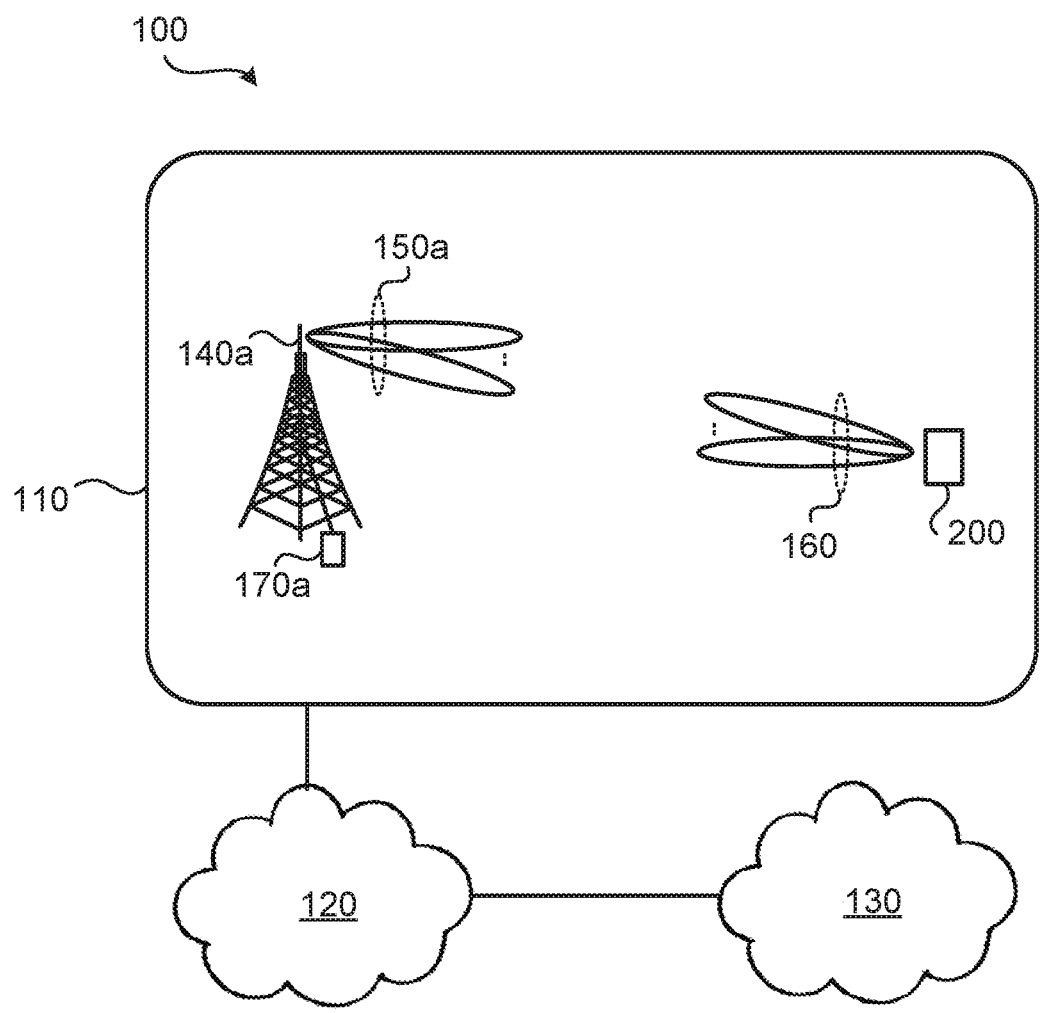
FIGS. 1 and 2 are schematic diagrams illustrating communications networks according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth generation (5G) telecommunications network and support any 3GPP telecommunications standard, where applicable.

The communications network 100 comprises a network node 170a configured to provide network access to at least one terminal device 200 in a radio access network no. The radio access network no is operatively connected to a core network 120. The core network 120 is in turn operatively connected to a service network 130, such as the Internet. The terminal device 200 is thereby, via a TRP 140a of the network node 170a, enabled to access services of, and exchange data with, the service network 130.

Examples of network nodes 170a are radio access network nodes, radio base stations, base transceiver stations, Node Bs, evolved Node Bs, g Node Bs, access points, and access nodes, and backhaul nodes. Examples of terminal devices 200 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The network node 170a is configured to communicate with the terminal device 200 in beams 150a, and the terminal device 200 is configured to communicate with the network node 170a in beams 160. Further, the network node 170a and the terminal device 200 could be configured to communicate with each other using a variety of beams having different shapes and widths, herein generally referred to as having different beam patterns.

As noted above, for a given communication link, a respective beam can be applied at both the network-end (as represented by the network node 170a or the TRP 140a) and at the terminal-end (as represented by terminal device 200), which typically is referred to as a beam pair link (BPL). However, in this respect, although some embodiments and illustrative examples describe that the terminal device 200 implements beamforming and is configured to transmit and/or receive in two or more beams 160, there embodiments disclosed hereinafter are equally applicable for a terminal device 200 configured only to communicate in one single beam. In such cases it is then assumed that at least two beams can be generated at the network-side such that a first BPL (e.g., defining a current BPL) is defined by a first beam at the network-side and the single beam at the terminal-side and a second BPL (e.g., defining an alternative BPL) is defined by a second beam at the network-side and the same single beam at the terminal-side.

As noted above, it could be that after a while, the beams of the BPL no longer are the best, in terms of some quality criterion, for the communication between the terminal device 200 and the network node 170a. One example thereof is that a beam link failure occurs. A beam recovery procedure can be used to handle the beam link failure instead of relying on a recovery procedure for handling a radio link failure (RLF) which is much more costly (in terms signalling overhead) and time consuming. The purpose of the beam recovery procedure is to find an alternative BPL in case the communication on the current BPL encounters a disturbance resulting in beam link failure. The beam recovery procedure will be disclosed next.

Beam failure detection: The terminal device 200 detects beam failure by monitoring a dedicated reference signal (such as a channel state information signal; CSI-RS or part of a synchronization signal block; SSB) as transmitted by the TRP 140a of the network node 170a and assesses if a trigger condition has been met. The trigger condition might be based on a block error rate threshold value for physical downlink control channel. The terminal devices 200 therefore translates the measurements on the received reference signal to a corresponding block error rate value and compares this value to the block error rate threshold value. A trigger condition is met (i.e. a beam link failure is declared) if the corresponding block error rate value is above the block error rate threshold value for M consecutive measurement occasions (where M is an integer and where the value of M is configurable).

New alternative beam identification: In order to quickly find an alternative BPL after a beam link failure the terminal device 200 might constantly monitor beam identification reference signals (such as SSB or periodic CSI-RS) as transmitted by the TRP 140a of the network node 170a also on other beams than the current beam. The terminal device is thereby enabled to determine a preferred alternative beam to be used at the TRP 140a as well as a preferred alternative beam to be used by the terminal device 200 for the alternative BPL based on these measurements.

Beam failure recover request transmission: When the terminal device has declared a beam link failure and a new alternative beam has been determined, the terminal device transmits a beam failure recovery request (BFRQ) on towards the network node to notify the network about the beam link failure. The BFRQ implicitly informs the network node about the preferred alternative beam to be used at the TRP 140a.

Response monitoring: The terminal device monitors for a beam failure recovery request response from the network node on the new alternative beam pair link to finalize the beam link recovery procedure.

It has been realized that it might be advantageous for the terminal device to switch to the alternative BPL even if the trigger condition is not met. For example, it could be that the alternative BPL is better than the current BPL due to the communication on the current BPL encountering a disturbance, without the disturbance leading to the quality of the communication on the current BPL deteriorating by such a degree that the trigger condition for beam link failure is met. Blocking and interference are two examples of such disturbances. Blocking might be especially common at 6 GHz and above due to the narrow beams used at both the TRP of the network node and terminal device and the high penetration loss and diffraction loss at these high frequencies.

Figure 2:
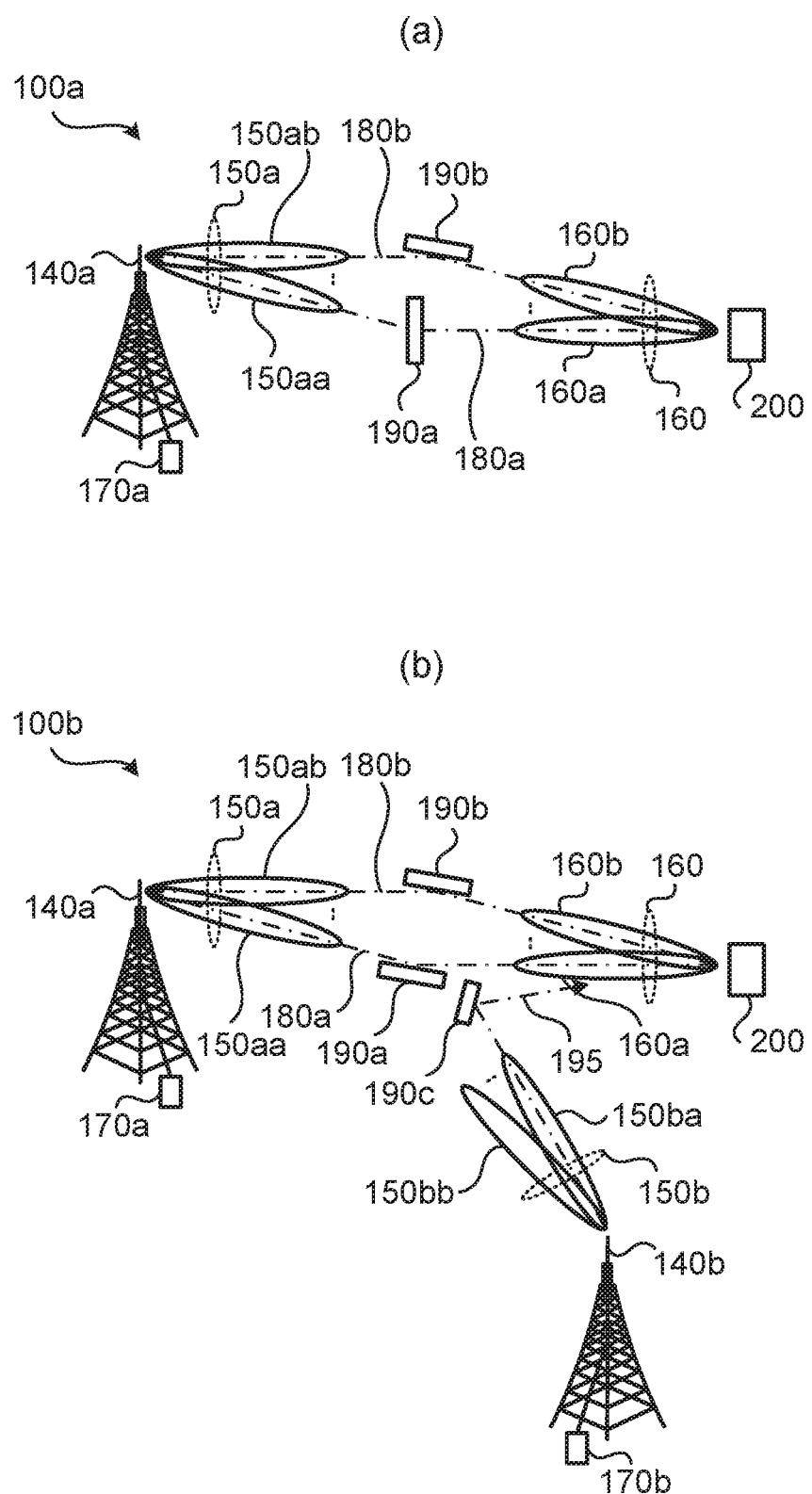

Reference is here made to FIGS. 2. at (a) and 2(b) schematically illustrating communications networks 100a, 100b similar to that of FIG. 1, but where the radio access network 110, the core network 120, and the service network 130 have been removed to not obstruct the concepts of these communications networks 100a, 100b. In FIG. 2 at both (a) and (b) the network node 170a and the terminal device 200 communicate in beams 150aa, 160a defining a current BPL 180a. Further, in FIG. 2 at both (a) and (b) the network node 170a and the terminal device 200 have an alternative BPL 180b defined by beams 150ab, 160b. The communication over the alternative BPL 180b is reflected in an object 190b.

In the scenario of FIG. 2 at (a) an object 190a is partly blocking and partly reflecting the current BPL 180a, whereas in the scenario of FIG. 2 at (b) the object 190a is only reflecting the current BPL 180a. In the scenario of FIG. 2 at (b) a further network node 170b is, via TRP mob, transmitting in beams 150ba, 150bb, where the transmission on beam 150ba is reflected in an object 190c, causing the transmission to, along the direction 195, interfere with the reception in beam 160a of the terminal device. The transmission from the TRP mob of the further network node 170b is thereby interfering with the current BPL 180a.

In both these scenarios it could be advantageous to switch from the current BPL 180a to the alternative BPL 180b, even if neither the blocking in the scenario of FIG. 2 at (a) nor the interference in the scenario of FIG. 2 at (b) are so strong that the criterion for triggering a beam link failure is met.

The embodiments disclosed herein thus relate to mechanisms for causing a switch to an alternative beam pair link 180b. In order to obtain such mechanisms there is provided a terminal device 200, a method performed by the terminal device 200, a computer program product comprising code, for example in the form of a computer program, that when run on a terminal device 200, causes the terminal device 200 to perform the method.

Figure 3:
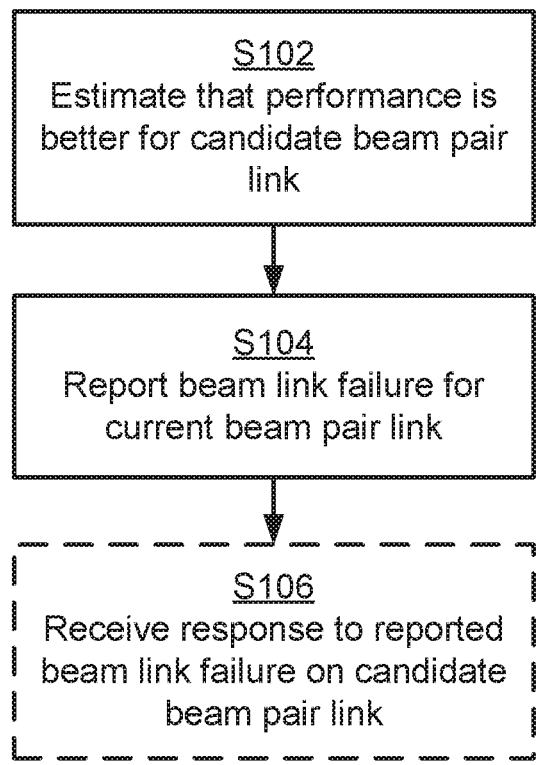
FIG. 3 is a flowchart of methods according to embodiments.

FIG. 3 is a flowchart illustrating embodiments of methods for causing a switch to an alternative beam pair link 180b. The methods are performed by the terminal device 200. The terminal device 200 is configured with a trigger condition for beam link failure. The methods are advantageously provided as computer programs 720.

It is assumed that the terminal device 200 has ongoing communication with the network node 170a over a current beam pair link 180a. The communication could pertain to control signalling or data signalling. In other aspects the current beam pair link 180a is maintained merely for potential future transmission and/or reception of control signalling or data signalling, where the communication thus pertains to reception at the terminal device 200 of reference signals transmitted by the network node 170a. It is further assumed that the terminal device 200 employs a mechanism for estimating performance of at least one alternative beam pair link 180b. Particularly, the terminal device 200 is configured to perform step S102:

S102: The terminal device 200 estimates, during communication with the network node 170a over a current beam pair link 180a, that performance of the communication would be better if using the alternative beam pair link 180b instead of the current beam pair link 180a for the communication.

Upon having estimated that the communication would be better if using the alternative beam pair link 180b the terminal device 200 reports a false beam link failure to the network node 170a. Particularly, the terminal device 200 is configured to perform step S104:

S104: The terminal device 200 reports beam link failure of the current beam pair link 180a to the network node 170a. The beam link failure is reported without the trigger condition for beam link failure of the current beam pair link 180a being met. The terminal device 200 thereby causes the switch to the alternative beam pair link 180a.

Thereby, by means of triggering a false beam link failure the terminal device 200 causes the network node 170a to switch communicating with the terminal device 200 from being over the current beam pair link 180a to being over the alternative beam pair link 180b, without the need for additional beam management.

The terminal device 200 is thereby configured to declare a false beam link failure when the actual trigger condition is not met, but when for other reasons another beam pair link, as defined by the alternative beam pair link 180b, is expected to result in better performance.

Embodiments relating to further details of causing a switch to an alternative beam pair link 180b as performed by the terminal device 200 will now be disclosed.

There could be different ways for the terminal device 200 to report the beam link failure in step S104. According to an alternative the beam link failure is reported in a beam failure recovery request.

In order to minimize overhead signalling the beam failure recovery request might identify the alternative beam pair link 180b. Hence, according to an embodiment the alternative beam pair link 180b is identified in the beam failure recovery request. In this respect, the alternative beam pair link 180b might be implicitly indicated by the beam failure recovery request referring to, or pointing to, a reference signal received from the network node 170a on the alternative beam pair link 180a.

There could be different ways for the network node 170 to react to the reported beam link failure. In some aspects the network node 170a responds to the terminal device 200. Particularly, according to an embodiment the terminal device 200 is configured to perform (optional) step S106:

S106: The terminal device 200 receives a response to the reported beam link failure from the network node 170a.

There could be different types of responses. In some aspects the network node 170a responds with beam failure request response. Hence, according to an embodiment the response received in step S106 is a beam failure request response.

There could be different ways for the network node 170 to send the response. In order to minimize overhead signalling the network node 170a might send the beam failure request response in the alternative beam pair link 180b. Hence, according to an embodiment the response is received on the alternative beam pair link 180a.

The terminal device 200 and the network node 170a might then continue the communication on the alternative beam pair link 180a.

There could be different ways for the terminal device 200 to estimate the performance. In some aspects the performance is by the terminal device 200 estimated from reference signals received on the current beam pair link 180a and on the alternative beam pair link 180b. Particularly, according to an embodiment the estimating (in step S102) is based on a first measurement of at least one first reference signal received on the current beam pair link 180a and on a second measurement of at least one second reference signal received on the alternative beam pair link 180a.

It might not be enough that the terminal device 200 receives a single reference signal on the current beam pair link 180a and a single reference signal on the alternative beam pair link 180b, for example due to fast fading. Therefore, in some aspects the terminal device 200 is configured to receive multiple reference signals before declaring beam link failure in order to make sure that the radio propagation channel is stable. Particularly, according to an embodiment there are at least two first measurements, each of at least one first reference signal, and there are at least two second measurements, each of at least one second reference signal.

Further, filtering of the measurements might remove short-term effects, such as fast fading. Therefore, according to an embodiment the estimating (in step S102) comprises filtering the at least two first measurements and filtering the at least two second measurements. The performance is then based on the thus filtered measurements.

There could be different types of filters that are used for the filtering of the measurements. In some aspects the filter is a low-pass filter. Hence, according to an embodiment the filtering comprises averaging the measurements over time. The terminal device 200 might thus filter the measurements over a period of time in order to obtain more reliable estimates of the performance of the different beam pair links.

There could be different examples of reference signals that the terminal device 200 receives on the current beam pair link 180a and on the alternative beam pair link 180b. According to an example the first reference signal is a CSI-RS or is part of an SSB received on the current beam pair link 180a, and the second reference signal is part of another SSB or is another CSI-RS received on the alternative beam pair link 180b. In this respect it might be so that the first reference signal is a CSI-RS and the second reference signal is part of an SSB, although other alternatives are also possible.

Further, the width of the beam 160a, 160b used by the terminal device 200 might impact the performance of the communication. Thus, since the beam 160a used by the terminal device 200 for the current beam pair link 180a and the beam 160b used by the terminal device 200 for the alternative beam pair link 180b might be of different widths, a relation between these respective widths might be taken into account when estimating whether the current beam pair link 180a or the alternative beam pair link 180b is best. In this respect it might be that a broader beam is better than a narrow beam. Thus, the performance might be biased to favour a broad beam over a narrow beam. Particularly, according to an embodiment the wireless device 200 uses a first beam 160a having a first beam width for the current beam pair link 180a and a second beam 160b having a second beam width for the alternative beam pair link 180b, and the performance is biased by a relation between the first beam width and the second beam width. As the skilled person understands, there could be different ways to measure the width of a beam, such as the width of the main lobe. However, the embodiments disclosed herein are not limited to any particular measure of the width of the beams, as long as the width of the first beam 160a is measured in the same way as the width of the second beam 160b. The same also applies to the width of the beam 150aa, 150ab used by the TRP 140a of the network node 170, which might also impact the performance of the communication. Thus if the terminal device 200 has knowledge of the width of the beam 150aa, 150ab also a relation between these beam widths can be used to bias the performance, where the performance might be biased to favour a broad beam over a narrow beam.

Although the terminal device 200 is configured to report a beam link failure without the triggering condition for beam link failure being met, there could still be some limitations on how many, or how often the terminal device 200 is allowed to report beam link failures. For example, there could be limitations on the number of beam changes during a given time period. Particularly, according to an embodiment the wireless device 200 is restricted in terms of number of beam link failures allowed to be reported over a given period of time.

There could be different criteria for which the performance is estimated. According to a non-limiting example the performance is estimated in terms of reference signal received power (RSRP), signal to noise ratio (SNR), signal to interference plus noise ratio (SINR), or path gain. That is, how the terminal device 200 estimates that the alternative beam pair link 180b is better than the current beam pair link 180a might be based either with interference estimation (such as for SINR) or without interference estimation (such as for SNR or path gain).

The terminal device 200 might be configured with different kinds of trigger conditions for beam link failure. As noted above, the trigger condition for beam link failure might be given in terms of a block error rate threshold value. The block error rate threshold value might pertain to the block error rate of reception at the wireless device 200 of a physical downlink control channel (such as the PDCCH defined in Long Term Evolution LTE as standardised within the third generation partnership project (3GPP)) from the network node 170a.

In this respect, the terminal device 200 need not necessarily receive the PDCCH during the communication with the network node 170a. The above-referred reception at the wireless device 200 of a physical downlink control channel should thus be regarded as a hypothetical reception. In more detail, instead of the terminal device 200 receiving the physical downlink control channel, the terminal device 200 receives some other signal or channel for which a quality measure can be compared, either directly or via a translation, to a block error rate threshold value of the physical downlink control channel. The terminal device 200 therefore, in some aspects, translates the estimated performance for the current beam pair link 180a to a block error rate value. Hence, according to an embodiment the estimated performance for the current beam pair link 180a corresponds to a block error rate value. The beam link failure of the current beam pair link 180a might then be reported even when the block error rate value for the current beam pair link 180a is below the block error rate threshold value.

Figure 4:
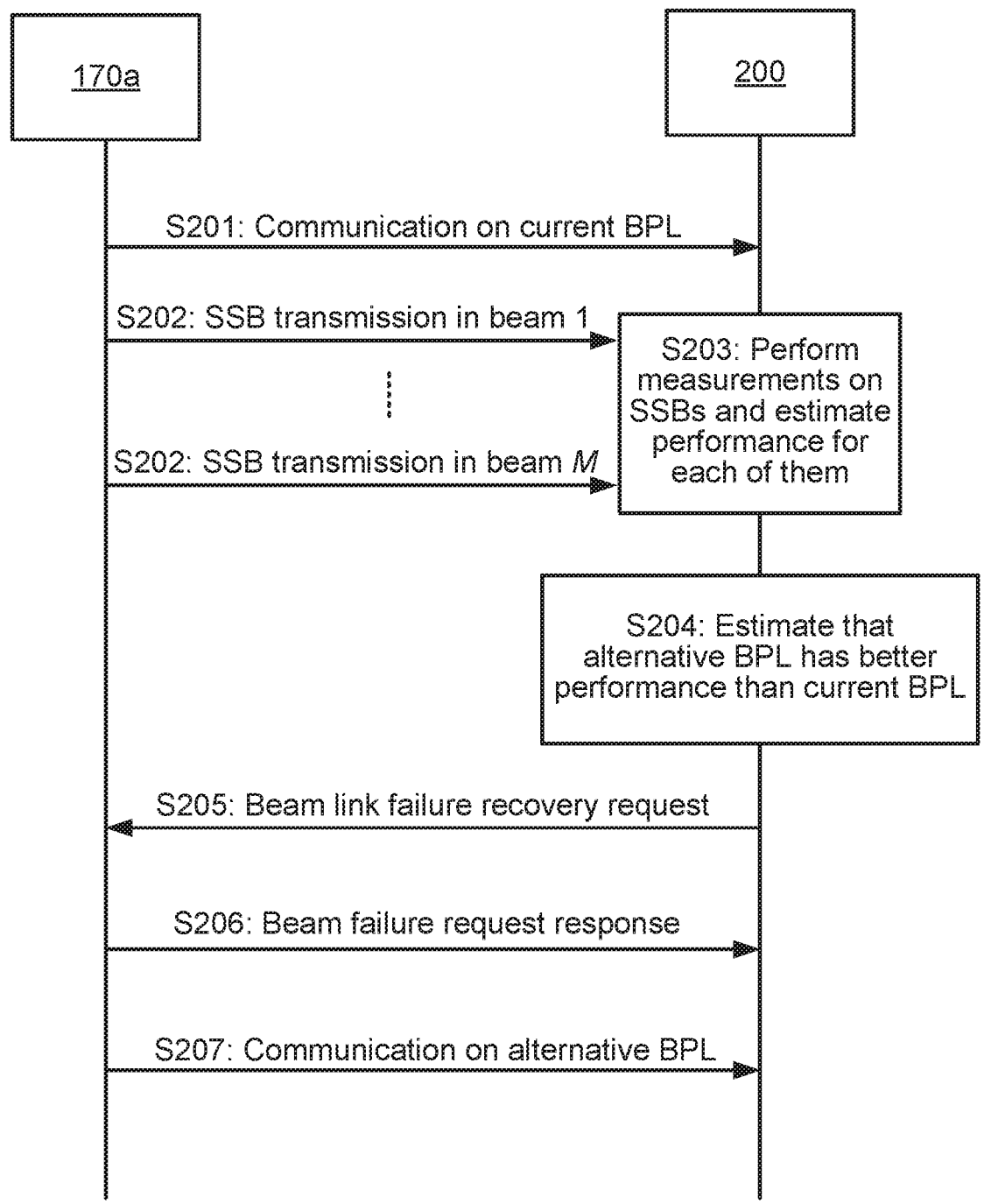
FIG. 4 is a signalling diagram of a method according to an embodiment.

One particular embodiment for causing a switch to an alternative beam pair link 180b as performed by the terminal device 200 based on at least some of the above disclosed embodiments will now be disclosed with reference to the signalling diagram of FIG. 4.

S201: The network node 170a and the terminal device 200 communicate over a current beam pair link 180a.

S202: The network node 170a periodically transmits SSB in its beams 150aa, 150ab (where there is transmission of SSB in M≥2 such beams in the signalling diagram of FIG. 4).

S203: The terminal device 200 performs measurements on the SSB as transmitted by the network node 170a and uses these measurements to estimate the performance for at least one alternative beam pair link 180a.

S204: The terminal device 200 estimates that at least one alternative beam pair link 180b has better performance than the current beam pair link 180a, but where the performance of the current beam pair link 180a is not so bad that a trigger condition for beam link failure of the current beam pair link 180a is met. One way to implement step S204 is to perform step S102.

S205: The terminal device 200 initiates a false beam failure recovery procedure by transmitting a beam link failure recovery request to the network node 170a. The beam link failure recovery request implicitly indicates to the network node 170a the beam 150ab at the TRP 140a of the network node 170a that corresponds to the alternative beam pair link 180a. One way to implement step S203 is to perform step S104.

S206: The network node 170a signals a beam failure request response to the terminal device 200 using the alternative beam pair link 180b. One way to implement step S205 is to perform step S106.

S207: The network node 170a and the terminal device 200 starts to communicate over the alternative beam pair link 180b.

Figure 5:
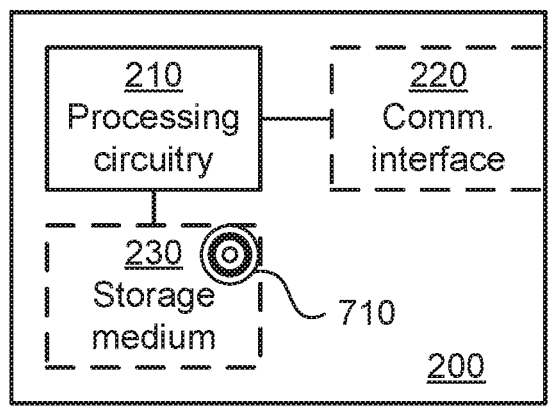
FIG. 5 is a schematic diagram showing functional units of a terminal device according to an embodiment.

FIG. 5 schematically illustrates, in terms of a number of functional units, the components of a terminal device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200 to perform a set of operations, or steps, as disclosed above. For example, the storage medium 230 may store the set of operations, and the processing circuitry 210 may be configured to retrieve the set of operations from the storage medium 230 to cause the terminal device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The terminal device 200 may further comprise a communications interface 220 at least configured for communications with other entities, nodes, functions, and devices in the communications networks 100, 100a, 100b. As such the communications interface 220 may comprise one or more transmitters and receivers, comprising analogue and digital components. The processing circuitry 210 controls the general operation of the terminal device 200 e.g. by sending data and control signals to the communications interface 220 and the storage medium 230, by receiving data and reports from the communications interface 220, and by retrieving data and instructions from the storage medium 230. Other components, as well as the related functionality, of the terminal device 200 are omitted in order not to obscure the concepts presented herein.

Figure 6:
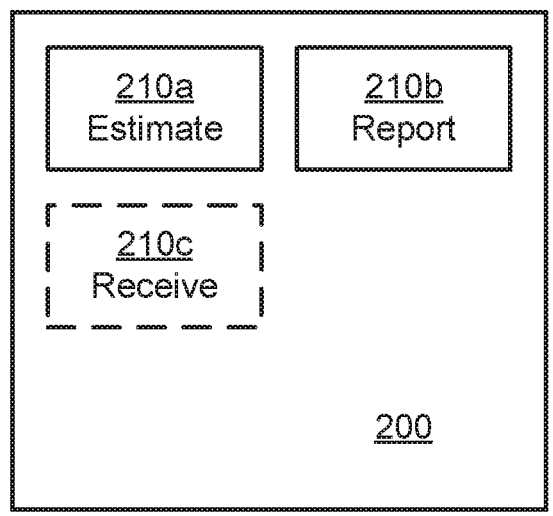
FIG. 6 is a schematic diagram showing functional modules of a terminal device according to an embodiment.

FIG. 6 schematically illustrates, in terms of a number of functional modules, the components of a terminal device 200 according to an embodiment. The terminal device 200 of FIG. 6 comprises a number of functional modules; an estimate module 210a configured to perform step S102 and a report module glob configured to perform step S104. The terminal device 200 of FIG. 6 may further comprise a number of optional functional modules, such as a receive module 210C configured to perform step S106. In general terms, each functional module 210a-210C may in one embodiment be implemented only in hardware and in another embodiment with the help of software, i.e., the latter embodiment having computer program instructions stored on the storage medium 230 which when run on the processing circuitry makes the terminal device 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional 210a-210C may be implemented by the processing circuitry 210, possibly in cooperation with the communications interface 220 and/or the storage medium 230. The processing circuitry 210 may thus be configured to from the storage medium 230 fetch instructions as provided by a functional module 210a-210c and to execute these instructions, thereby performing any steps as disclosed herein.

Examples of terminal devices 200 have been provided above.

Figure 7:
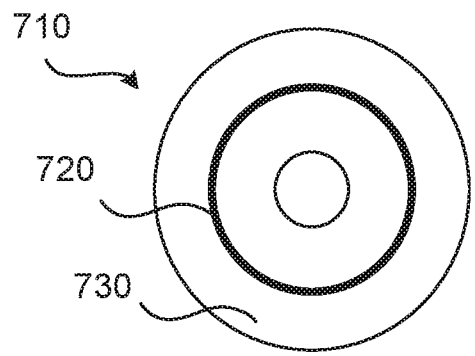
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed. In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for causing a switch to an alternative beam pair link, the method being performed by a terminal device, wherein the terminal device is configured with a trigger condition for beam link failure, the method comprising:
   estimating, during communication with a network node over a current beam pair link, that performance of the communication would be better if using the alternative beam pair link instead of the current beam pair link for the communication; and
   reporting beam link failure of the current beam pair link to the network node thereby causing the switch to the alternative beam pair link;
   wherein reporting the beam link failure is independent of the trigger condition for beam link failure of the current beam pair link being met.

2. The method according to claim 1, wherein the beam link failure is reported in a beam failure recovery request.

3. The method according to claim 2, wherein the alternative beam pair link is identified in the beam failure recovery request.

4. The method according to claim 1, further comprising:
   receiving a response to the reported beam link failure from the network node.

5. The method according to claim 4, wherein the response is a beam failure request response.

6. The method according to claim 4, wherein the response is received on the alternative beam pair link.

7. The method according to claim 1, wherein the estimating is based on a first measurement of at least one first reference signal received on the current beam pair link and on a second measurement of at least one second reference signal received on the alternative beam pair link.

8. The method according to claim 7, wherein there are at least two first measurements, each of at least one first reference signal, and there are at least two second measurements, each of at least one second reference signal.

9. The method according to claim 8, wherein the estimating comprises filtering the at least two first measurements and filtering the at least two second measurements, and wherein the performance is based on the thus filtered measurements.

10. The method according to claim 9, wherein the filtering comprises averaging the measurements over time.

11. The method according to claim 7, wherein the first reference signal is a channel state information reference signal or is part of a synchronization signal block received on the current beam pair link, and wherein the second reference signal is part of another synchronization signal block or is another channel state information reference signal received on the alternative beam pair link.

12. The method according to claim 1, wherein the wireless device uses a first beam having a first beam width for the current beam pair link and a second beam having a second beam width for the alternative beam pair link, and wherein the performance is biased by a relation between the first beam width and the second beam width.

13. The method according to claim 1, wherein the wireless device is restricted in terms of number of beam link failures allowed to be reported over a given period of time.

14. The method according to claim 1, wherein the performance is estimated in terms of reference signal received power, signal to noise ratio, signal to interference plus noise ratio, or path gain.

15. The method according to claim 1, wherein the trigger condition for beam link failure is given in terms of a block error rate threshold value.

16. The method according to claim 15, wherein the block error rate threshold value pertain to block error rate of reception at the wireless device of a physical downlink control channel from the network node.

17. The method according to claim 16, wherein the beam link failure of the current beam pair link is reported even when the block error rate value for the current beam pair link is below the block error rate threshold value.

18. The method according to claim 1, wherein the estimated performance for the current beam pair link corresponds to a block error rate value.

19. A terminal device for causing a switch to an alternative beam pair link, the terminal device being configured with a trigger condition for beam link failure and comprising processing circuitry, the processing circuitry being configured to cause the terminal device to:
   estimate, during communication with a network node over a current beam pair link, that performance of the communication would be better if using the alternative beam pair link instead of the current beam pair link for the communication; and
   report beam link failure of the current beam pair link to the network node thereby causing the switch to the alternative beam pair link;
   wherein the processing circuitry is configured to cause the terminal device to report the beam link failure independent of the trigger condition for beam link failure of the current beam pair link being met.

20. A non-transitory computer-readable medium having stored thereon computer-executable instructions which, when run on processing circuitry of a terminal device configured with a trigger condition for beam link failure, cause the terminal device to:
   estimate, during communication with a network node over a current beam pair link, that performance of the communication would be better if using an alternative beam pair link instead of the current beam pair link for the communication; and
   report beam link failure of the current beam pair link to the network node thereby causing a switch to the alternative beam pair link;
   wherein the computer-executable instructions cause the terminal device to report the beam link failure independent of the trigger condition for beam link failure of the current beam pair link being met.

* * * * *